US006344166B1

(12) United States Patent
Aoki et al.

(10) Patent No.: US 6,344,166 B1
(45) Date of Patent: *Feb. 5, 2002

(54) CONTAINER HAVING A REDUCED AMOUNT OF ACETALDEHYDE RELEASED THEREFROM AND METHOD OF MOLDING THE SAME

(75) Inventors: Daiichi Aoki; Hiroyuki Orimoto, both of Ueda; Katsumasa Yokota, Nagano-ken, all of (JP)

(73) Assignee: Nissei ASB Machine Co. Ltd., Nagano-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,684

(22) Filed: Apr. 22, 1998

(30) Foreign Application Priority Data

Apr. 23, 1997 (JP) .............................................. 9-120333
Nov. 18, 1997 (JP) .............................................. 9-333568

(51) Int. Cl.[7] .......................... B29C 49/64; B29C 71/00
(52) U.S. Cl. ...................... 264/521; 264/530; 264/532; 264/904; 264/905
(58) Field of Search ................................ 264/530, 905, 264/906, 904, 521, 532

(56) References Cited

U.S. PATENT DOCUMENTS

| 3,733,309 A | | 5/1973 | Wyeth | |
|---|---|---|---|---|
| 4,039,641 A | * | 8/1977 | Collins | 264/28 |
| 4,223,128 A | * | 9/1980 | Halek et al. | 528/481 |
| 4,385,089 A | * | 5/1983 | Bonnebat et al. | 428/35 |
| 4,550,007 A | * | 10/1985 | Ohtsu et al. | 264/530 |
| 5,178,816 A | * | 1/1993 | Suzuki et al. | 264/530 |
| 5,235,027 A | | 8/1993 | Thiele et al. | 528/308.2 |
| 5,308,233 A | * | 5/1994 | Denis et al. | 425/526 |
| 5,540,879 A | * | 7/1996 | Orimoto et al. | 264/530 |
| 5,611,987 A | * | 3/1997 | Kato et al. | 264/906 |

FOREIGN PATENT DOCUMENTS

| EP | 0061414 | 9/1982 |
|---|---|---|
| EP | 0227608 | 7/1987 |
| EP | 0 227 608 A | 7/1987 |
| EP | 0425360 | 5/1991 |
| EP | 0 425 360 A | 5/1991 |
| JP | 62-181339 | 8/1987 |
| JP | 6-55418 | 7/1994 |
| JP | 6-88314 | 11/1994 |
| JP | 8-5118 | 1/1996 |

* cited by examiner

Primary Examiner—Suzanne E. McDowell
(74) Attorney, Agent, or Firm—David L Hoffman, Esq.; Cislo & Thomas, LLP

(57) ABSTRACT

A container molding method for reducing the amount of released acetaldehyde. The method comprises a primary blow molding step of stretch-blow-molding a preform into a primary blow-molded article; an acetaldehyde reducing step of reducing the amount of acetaldehyde released from the primary blow-molded article; and a final blow molding step of stretch-blow-molding the primary blow-molded article having a reduced amount of acetaldehyde into a final container. The primary blow molding step molds the primary blow-molded article which is larger in size than the final container and which has an average wall-thickness of a stretched barrel portion equal to or less than 0.3 mm, that is smaller than the average wall-thickness of a barrel portion of the final container. The acetaldehyde reducing step heats the thin-walled barrel portion of the primary blow-molded article at a high temperature for a relatively short time. As a result, the final container having a reduced amount of acetaldehyde released from the inner wall of the final container will be molded.

29 Claims, 1 Drawing Sheet

CONTAINER HAVING A REDUCED AMOUNT OF ACETALDEHYDE RELEASED THEREFROM AND METHOD OF MOLDING THE SAME

BACKGROUND OF THE INVENTION

1. Field of the Invention

The present invention relates to a container having a reduced amount of acetaldehyde released therefrom and a method of molding that container. Particularly, the present invention relates to a method of molding a food packaging container of polyester resin having a reduced amount of acetaldehyde released therefrom, particularly a non-heat-resistant container, and also relates to such a non-heat-resistant container itself.

2. Prior Art

There are broadly known containers for mineral water, carbonated beverages, or the like, which are formed by biaxial stretch blow molding of a saturated polyester such as polyethylene terephthalate. Such containers are called "PET bottles".

It is also known that the polyester resin used to form such containers includes acetaldehyde. Acetaldehyde may be newly produced from the thermal decomposition of polyester due to residence or shear heating during the injection molding or extruding process, in addition to acetaldehyde included in the original polyester material.

Acetaldehyde is an organic substance having a peculiar smell and raises a problem in that it affects the taste of a beverage contained in a container when polyester resin is used to form the container.

It is therefore desired to reduce the amount of acetaldehyde released from the containers to as little as possible. Many proposals for reduction of acetaldehyde have been made heretofore.

Almost all the proposals relate to reduction of acetaldehyde in the polyester materials. Some of them are commercially successful, but resultant materials are very expensive in comparison with the conventional materials, leading to increase of cost in the product.

Even if such very expensive materials are used, one could not greatly reduce the amount of acetaldehyde produced on the injection molding or other process.

The applicant has proposed some methods of making heat-resistant containers as described in Japanese Patent Publication Nos. Hei 6-88314, Hei 8-5118 and Hei 6-55418.

In these proposals, a preform is stretch-blow-molded into a primary blow-molded article in the form of a container and then it is heated in an oven to improve its criplallinity and to be shrunk by heat before it is stretch-blow-molded into a final product or a heat resistant container.

Particularly, the methods of Japanese Patent Publication Nos. Hei 6-88314 and Hei 8-5118 are epochal in that acetaldehyde can greatly be reduced by heat.

In the just mentioned methods, however, the blow-molded article is heated by passing it through a long oven for a relatively long time between 20 and 120 seconds and preferably no shorter than 30 seconds.

Such a relatively long heating time lengthens the molding cycle, decreases the productivity per unit time and increases the running cost. By the use of an oven, the entire length of the molding machine is elongated to increase the cost of equipment and maintenance. As a result, the unit price of containers will increase.

It is acceptable that the heat-resistant containers are higher in cost than non-heat-resistant containers since the heat-resistant containers have an added value of heat resistance. However, the non-heat-resistant containers must be reduced in cost.

Therefore, the reduction of acetaldehyde in the non-heat-resistant containers only now depends on selection of the molding material and injecting condition. This means the reduction of acetaldehyde is limited.

SUMMARY OF THE INVENTION

It is therefore an object of the present invention to provide a method of molding non-heat-resistant containers which purposely adopts a process of molding heat-resistant containers and which can reduce the amount of acetaldehyde released from the molded containers while greatly reducing the heating time in comparison with the heat-resistant container molding process, and to provide a container molded by such a method.

Another object of the present invention is to provide a method of efficiently molding a container having a reduced amount of acetaldehyde released therefrom by thinning the wall thickness of the primary blow-molded article to shorten the heating time without increase of the entire system and without reduction of the productivity, and to provide a container molded by such a method.

Still another object of the present invention is to further shorten the heating time by the contact heating of a primary blow-molded article to improve the molding efficiency.

According to a first aspect of the present invention, there is provided a container molding method comprising:

a primary blow molding step of stretch-blow-molding a preform into a primary blow-molded article;

an acetaldehyde reducing step of reducing the amount of acetaldehyde released from the primary blow-molded article; and a final blow molding step of stretch-blow-molding the primary blow-molded article having a reduced amount of acetaldehyde into a final container;

wherein the primary blow molding step molds the primary blow-molded article which is larger in size than the final container and which has an average wall-thickness of a stretched barrel equal to or less than 0.3 mm, that is smaller than an average wall-thickness of a barrel of the final container, wherein the acetaldehyde reducing step includes a step of heating the thin-walled barrel of the primary blow-molded article at a high temperature, whereby the amount of acetaldehyde released from an inner wall of the final container is reduced.

A container having an extremely reduced amount of acetaldehyde released or appearing therefrom can be molded by stretch-blow-molding a preform made of a conventional resin material or a resin material having a lower amount of acetaldehyde into a primary blow-molded article having a thin-walled barrel, and then heat treating the primary blow-molded article before the primary blow-molded article is blow molded into the final container.

Particularly, since the primary blow-molded article is larger than the final container with the average wall-thickness of its barrel being equal to or smaller than 0.3 mm, that is thinner than that of the final container, the heating step in the acetaldehyde reducing step can be carried out for a shortened time to improve the productivity. In addition, the amount of acetaldehyde released from the inner wall of the final container can be efficiently reduced. The reduction of heating time enables the installation space to be reduced, leading to reduction of the system size and manufacturing cost.

Since the primary blow-molded article is heated to reduce the amount of acetaldehyde released from the primary blow-molded article before the final blow molding step, the precision of configuration in the final blow molding step will be improved.

The resultant container is good for use as a non-heat-resistant container which is to be filled with a content at a temperature of 65° C. or less and particularly with a mineral water or other beverage. This is because the smell peculiar in acetaldehyde is greatly reduced therein.

The average wall-thickness in the barrel of the final container obtained by stretch-blow-molding the primary blow-molded article which has its average wall-thickness of 0.3 mm or less in the barrel thereof is less than 0.3 mm.

When the average wall-thickness in the barrel of the final container is less than 0.3 mm, the average wall-thickness in the barrel of the primary blow-molded article becomes extremely thin. Thus time required to reduce the amount of acetaldehyde can be shortened to improve the efficiency in molding.

The acetaldehyde reducing step may include a step of heating the primary blow-molded article at a temperature of 140° C. or higher. This is because the amount of acetaldehyde released from the inner wall of the final container is sharply reduced at a temperature equal to or higher than 140° C. In such a case, the heating time for the primary blow-molded article can be shortened to six seconds or less. If the heating temperature is equal to or higher than 190° C., the heating time will be equal to or less than one second. In such a manner, the high reduction of acetaldehyde released from the inner wall of the final container can be accomplished for an extremely short time, resulting in more improvement of the productivity.

The acetaldehyde reducing step may heat the primary blow-molded article so that the amount of acetaldehyde released from per unit surface area of the primary blow-molded article will be equal to or less than 0.0040 pg/cm$^2$. This can reduce the amount of acetaldehyde released from per unit surface area of the final container to a level equal to or less than 0.0020 μg/cm$^2$ when the final container is stored for 24 hours at 22° C. after the final blow molding step.

The acetaldehyde reducing step can make the primary blow-molded article in contact with an inner wall of a mold for heating, when this mold is substantially the same size as the primary blow-molded article and has been heated. When the thin-walled barrel of the primary blow-molded article is heated in contact with the heated inner mold wall of the mold which has substantially the same size as the primary blow-molded article, the heating time can be shortened to improve the productivity. Further, since the space for the heating step may be also the space for the mold, the blow molding machine can be reduced in size with reduced cost.

According to a second aspect of the present invention, there is provided a container producing method comprising:

a primary blow molding step of stretch-blow-molding a preform into a primary blow-molded article;

an acetaldehyde reducing step of reducing the amount of acetaldehyde released from the primary blow-molded article; and a final blow molding step of stretch-blow-molding the primary blow-molded article having the reduced amount of acetaldehyde into a final container, wherein the primary blow molding step molds the primary blow-molded article so that a ratio of weight to surface area becomes equal to or less than 0.06 g/cm$^2$, wherein the acetaldehyde reducing step heats a barrel of the primary blow-molded article at a high temperature, whereby the amount of acetaldehyde released from an inner wall of the final container is reduced.

If the ratio of weight to the surface area becomes equal to or less than 0.06 g/cm$^2$, the average wall-thickness in the barrel of the primary blow-molded article becomes extremely thin. Thus, the heating in the acetaldehyde reducing step can be carried out for a reduced time, resulting in improvement of the productivity.

DESCRIPTION OF THE PREFERRED EMBODIMENT

Figure 1:
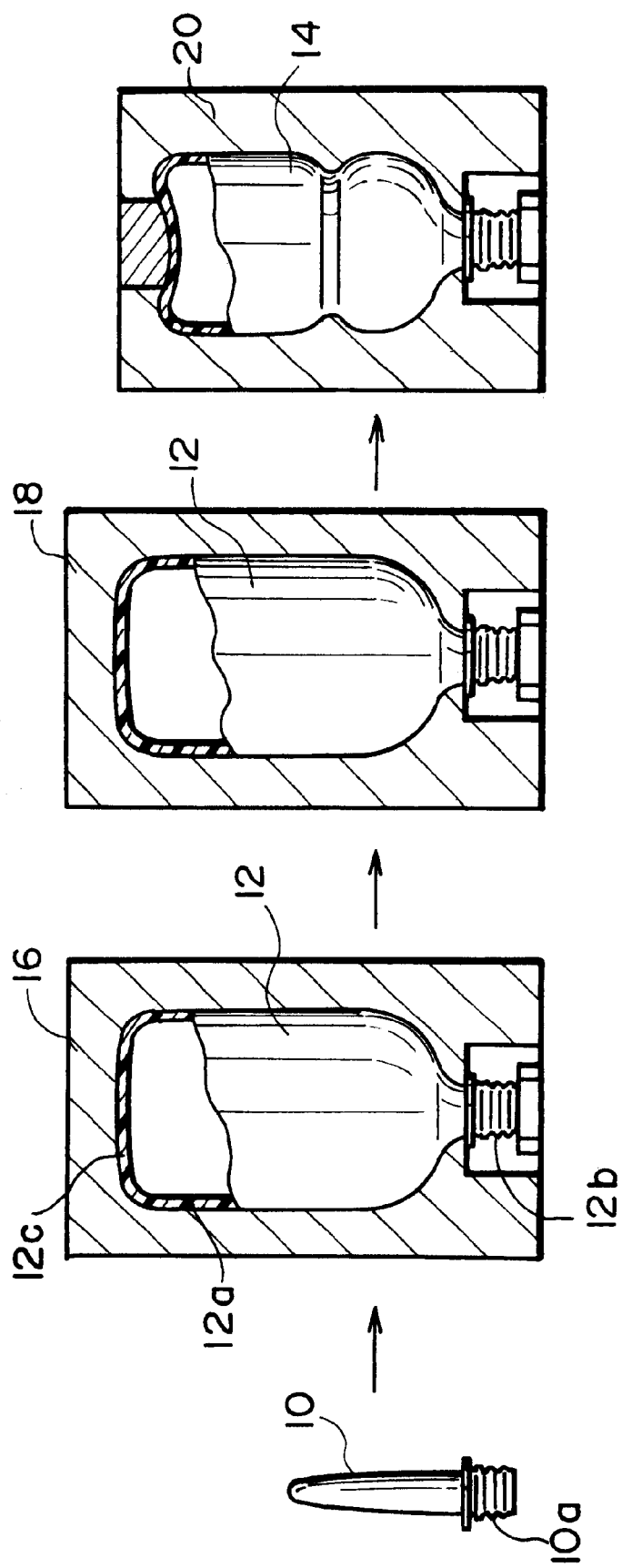
FIG. 1 is a view showing a method for molding a container according to one embodiment of the present invention.

One embodiment of the present invention will now be described with reference to the drawing.

FIG. 1 shows a method for molding a container according to one embodiment of the present invention. This figure shows a process of conveying a preform 10 in an inverted state with the neck 10a thereof being downwardly positioned, to be molded into a primary blow-molded article and then into a final container 14.

The first step shown in FIG. 1 is a step of injection-molding the preform 10; the second step is a step of blow-molding the preform 10 into a primary blow-molded article 12 which has a form of a container; the third step is a step of reducing the amount of acetaldehyde in the primary blow-molded article 12; and the fourth step is a step of blow-molding the primary blow-molded article 12 having a reduced amount of acetaldehyde released from the inner wall thereof into the final container 14.

The preform 10 is injection-molded from a polyester resin. The wall-thickness, length and other factors of the preform 10 are selected depending on the desired quality and capacity of the final container 14.

Polyester resin may be one on the market intended to reduce the amount of acetaldehyde or any of the other conventional materials on the market, not intended to reduce the amount of acetaldehyde.

The preform 10 keeps the injection molding temperature, or is heated to have a temperature suitable for the stretch blow molding after the injection molding, and then the preform 10 is biaxially stretch-blow-molded into the primary blow-molded article 12.

The weight of the preform 10 to be molded into a non-heat-resistant container is between 14 and 25 grams when a capacity of the final container 14 is 500 ml, between 22 and 35 grams when the capacity is 1000 ml, and between 30 and 45 grams when the capacity is 1500 ml. Such a weight is smaller than that of a preform used to mold a heat-resistant container. In comparison with this, the weight of the preform 10 when it is used to mold a heat-resistant container may be between 30 and 45 grams when a capacity of the final container 14 is 500 ml, between 45 and 50 grams when the capacity is 1000 ml, and between 55 and 60 grams when the capacity is 1500 ml.

In the primary blow molding step, a primary blow mold 16 is used to stretch-blow-mold the primary blow-molded article 12.

The stretch ratio of the primary blow-molded article 12 to the preform 10 in the direction of longitudinal axis ranges from 2.2 to 2.6. The primary blow-molded article 12 is formed larger than the final container 14. The ratio of capacity of the primary blow-molded article 12 to the final container 14 ranges from 1.15 to 1.3.

The stretch ratio in the primary blow molding step of this embodiment is smaller than those in the primary blow molding steps of the heat-resistant container molding methods which are disclosed in Japanese Patent Publication Nos. Hei 6-88314 and Hei 8-5118. This is because this embodiment does not intend to ensure the heat-resistant property and this embodiment does not require a stretch ratio as high as in the heat-resistant container. If it is attempted to provide a stretch as great as in the heat-resistant container, the wall-thickness of the primary blow-molded article becomes too thin, resulting in a burst.

As to a heat-resistant container, the stretch ratio of the primary blow-molded article to the preform in the direction of longitudinal axis ranges from 2.7 to 3.0.

The average wall-thickness in the barrel 12a of the primary blow-molded article 12 is thinner than that in the barrel 14a of the final container 14 and preferably equal to or less than 0.3 mm. It is to be noted herein that the barrel 12a of the primary blow-molded article 12 is a region except the neck 12b (including thread, support ring), the low-stretched thick-walled portion adjacent to the neck 12b, and the bottom 12c. As the average wall-thickness in the barrel 12a of the primary blow-molded article 12 is smaller, the reduction of acetaldehyde released from the inner wall thereof is more effectively accomplished for a reduced time. It is preferably equal to or smaller than 0.3 mm in average. When polyester resin is stretch-blow-molded, the wall-thickness of the barrel less than 0.15 mm may cause a burst or whitening during the primary blow molding step. It is thus preferable that $0.15 \text{ mm} \leq T \leq 0.3 \text{ mm}$ where T is the average wall-thickness in the barrel 12a of the primary blow-molded article 12.

It is more preferable that the primary blow-molded article 12 is so set that the average wall-thickness in the barrel of the final container 14 is smaller than 0.3 mm. This enables the reduction of acetaldehyde released from the inner wall of the primary blow-molded article 12 to be accomplished for a time period shorter than that required by a relatively thick-walled heat-resistant container. The average wall-thickness in the barrel of a primary blow-molded article used to provide a heat-resistant container is equal to or larger than about 0.35 mm. Such a wall-thickness is larger than that of this embodiment by 16% or more.

The average wall-thickness of the barrel is an average value of measurements taken at several (four to eight) points in a circumferential direction of the barrel at each of several (three to six) heights of the barrel between a position below the neck 12b (or support ring) by 20 mm and a position above the bottom surface by 20 mm.

The ratio of weight to surface area in the primary blow-molded article 12 has been measured. The weight of the primary blow-molded article 12 is identical with that of the preform. The surface area of the primary blow-molded article 12 includes those in the neck 12b and bottom 12c in addition to the barrel 12a. The ratio of weight to surface area in the primary blow-molded article 12 according to this embodiment is equal to or smaller than 0.06 $g/cm^2$. If such a ratio is less than 0.04 $g/cm^2$, the stretch blow molding becomes difficult. It is therefore preferable that $0.04 \text{ g/cm}^2 \leq W/S \leq 0.06 \text{ g/cm}^2$ where S is the surface area of the primary blow-molded article 12 and W is its weight. The ratio of weight to surface area in the primary blow-molded article 12 used to mold a heat-resistant container is about 0.07 $g/Cm^2$.

The amount of acetaldehyde released from the resultant primary blow-molded article 12 is between about 0.0030 $\mu g/cm^2$ and about 0.0080 $\mu g/cm^2$. In order to provide the amount of acetaldehyde released from the final container 14 being equal to 0.0020 $\mu g/cm^2$, it is desirable that the known conditions such as molding condition of the preform 10, material drying condition and other conditions are suitably selected so that the amount of acetaldehyde released from the primary blow-molded article 12 becomes equal to or less than about 0.0040 $\mu g/cm^2$.

The acetaldehyde reducing step uses a mold 18 which has the same inside configuration as that of the primary blow mold 16. This mold 18 is heated by the heating means which is not shown in the figure.

In this mold 18, the primary blow-molded article 12 is disposed for internal pressurization. Thus, the primary blow-molded article 12 can be instantaneously brought into contact with the inner wall of the mold 18. Thus, the amount of acetaldehyde released from the inner wall of the primary blow-molded article will be suppressed by heating the thin-walled barrel 12a at a high temperature.

Although the mechanism of reducing the amount of acetaldehyde released from the inner wall of the primary blow-molded article has not been found, it is supposed that, by heating the thin-walled barrel 12a at a high temperature, acetaldehyde is released (or evaporated) from the barrel 12a, or the arrangement of molecules is changed to constrain acetaldehyde.

In such a case, it is preferable that the primary blow-molded article 12 is heated for a time between one second and six seconds at a temperature equal to or higher than 140° C. If the heating temperature is 120° C., the remarkable reduction of acetaldehyde requires a heating time equal to or longer than 20 seconds. It is too long for efficient molding. If the heating temperature is equal to or higher than 140° C., the heating time will be reduced to be equal to or shorter than six seconds. If the heating temperature is equal to or higher than 190° C., the heating time will be reduced to a very short time of about one second with acetaldehyde being sharply reduced.

If the heating temperature exceeds 220° C., usually, the primary blow-molded article 12 will adhere to the inner surface of the mold. This is not desirable in that the outer surface of the primary blow-molded article 12 may be roughened.

It is further preferable that the acetaldehyde reducing step heats the primary blow-molded article 12 so that the final container 14 provided by the final blow molding step has the amount of acetaldehyde equal to or lower than 0.0020 $\mu g/cm^2$. The acetaldehyde reducing step can reduce the amount of acetaldehyde released from the inner wall of the primary blow-molded article substantially by half within an extremely short time of contact with the inner wall of the heated mold 18 without reduction of the productivity.

After being removed from the mold 18, the primary blow-molded article 12 is shrunk so that the size in its direction of height is equal to or slightly smaller than that of the final container 14.

In the final blow molding step, a final blow mold 20 is used to stretch-blow-mold the primary blow-molded article 12 into the final container 14.

In this case, the precision of the configuration in the final container 14 can highly be improved by heating the primary blow-molded article 12 in the acetaldehyde reducing step and then stretch-blow-molding it while maintaining its high temperature.

In order to further improve the precision of the configuration in the final container 14, it is preferable that the temperature of the final blow mold 20 has been previously regulated to be between 20° C. and 60° C.

Experiments

By using a preform molding machine PM-45 which is manufactured by Nissei ASB Co., Ltd., polyester resin for blow-molding available from JAPAN UNIPET Co., Ltd., (RT-543K) was melt and injection-molded into clear preforms. Such polyester resin is intended to reduce acetaldehyde with the amount of acetaldehyde therein being equal to or lower than 1 ppm:

In the prior art, the amount of acetaldehyde (ppm) within the injection molded preforms was reduced by regulating various factors such as the solid phase polycondensation of polyester resins temperature of the injection molding machine, screw design, screw speed, injection speed, design of the hot runner.

The amount of acetaldehyde in the preforms which were obtained by regulating these factors is equal to about 6 ppm minimum, although the amount of acetaldehyde produced after bottles have been molded is important. Such reduction of acetaldehyde in the preforms, however, is not satisfactory in the field in which the taste of mineral water and other beverages is taken very seriously.

In such experiment, it is not very important to compare the amount of acetaldehyde in the preforms and there is not any standard, but it is to be noted that the amount of acetaldehyde in the preforms was between about 6 ppm and about 10 ppm.

The resultant preforms were then blow-molded into containers by the use of a blow molding machine HS-45-6 of Nissei ASB Machine Co., Ltd..

Such a blow molding machine comprises a heating section including a plurality of infrared heaters for heating a preform up to a temperature suitable for stretching, a primary blow molding section including a primary blow mold mounted on a mold clamping mechanism, the primary blow mold being designed to stretch-blow-mold the preform into a primary blow-molded articles at the temperature suitable for stretching, and a heat treating section including a heat treating mold having the same configuration as that of the primary blow mold, this heat treating mold being designed to heat the primary blow-molded article, and a final blow molding section including a final blow mold mounted on the mold clamping mechanism, this final blow mold being designed to stretch-blow-mold the primary blow-molded article into a final container having a capacity of 500 ml after primary blow-molded article has been heated at a high temperature.

The primary blow-molded articles provided by the experiment had an average barrel wall-thickness equal to about 0.3 mm and weight per unit surface area equal to 0.06 g/cm$^2$. The capacity is larger than that of the final product which has a capacity of 500 ml by about 16%.

In this experiment, the reduction of acetaldehyde was compared from one container to another by measuring the amount of acetaldehyde per unit surface area released from the inner wall of the molded containers. In order to measure the amount of acetaldehyde per unit area, the inventors measured the amount of acetaldehyde melted in nitrogen gas filled in the final container which had been stored for 24 hours at 22° C. Then, the amount of acetaldehyde was divided by the inner area of the final container. Since the amount of acetaldehyde released from the inner wall of the containers is affected by the magnitude of the surface area, the containers having different capacities can be compared with one another with respect to the amount of acetaldehyde per unit surface area released from the containers.

The wall temperature of the heat treating mold, the heat treating time and the amounts of acetaldehyde per unit surface area released after the final products have been stored for 24 hours at 22° C. are shown in Table 1.

TABLE 1

| EXPERIMENT NUMBER | HEAT TREATMENT TEMPERATURE (° C.) | HEAT TREATMENT TIME (Sec) | AMOUNT OF ACETALDEHYDE ($\mu$g/cm$^2$) |
| --- | --- | --- | --- |
| 1 | 0 | 0 | 0.0034 |
| 2 | 120 | 20 | 0.0019 |
| 3 | 140 | 2 | 0.0019 |
| 4 | 140 | 6 | 0.0016 |
| 5 | 160 | 2 | 0.0015 |
| 6 | 180 | 2 | 0.0012 |
| 7 | 190 | 1 | 0.0012 |

Referring to Table 1, experiment 1 shows the amount of acetaldehyde released from a primary blow-molded article which was not heat-treated.

From the experimental results shown in Table 1, it is apparent that the amount of acetaldehyde was remarkably reduced at a heat treating temperature of 120° C., to a level equal to or lower than 0.0020 $\mu$g/cm$^2$ (experiment 2) after heating for about 20 seconds. However, this heat treating time is not satisfactory in view of the molding efficiency.

As the heat treating temperature increased to a level equal to or higher than 140° C., it was found that acetaldehyde was sharply reduced to provide, after about two seconds, the same result as obtained by the heat treating temperature for 20 seconds at 120° C. (experiment 3).

When the heat treating temperature was set at 140° C., it was found that acetaldehyde was reduced to one-half or less of the level in the primary blow-molded article which was not heat-treated (experiment 1) by prolonging the heat treating time to six seconds (experiment 4).

In one-stage molding machine in which the injection-molding time for a preform can be the longest time for the heat treatment, the condition of the experiment 2 wherein the heat treating temperature of 120° C. is attained for 20 seconds is satisfactory for desired productivity. In the cold parison method (two-stage method) which will not be influenced by the injection molding cycle, however, it is industrially preferred that a molding cycle equal to or shorter than six seconds together with a heat treating temperature equal to or higher than 140° C. is used to further improve the productivity.

From the experiment 7, it was found that if the heat treating temperature is equal to or higher than 190° C., a heat treating time equal to or shorter than one second can also reduce the amount of acetaldehyde to the same level as in the experiment 6 (180° C. and two seconds). Since the experiment 7 reduces time contacting the mold to increase the quality dispersion of product, it is desirable to set the heat treating time at least one second for stabilizing the quality of product.

Although not being shown in Table 1, it was also found that in a heat treatment wherein the heat treating temperature is 180° C. and the heat treating time is ten seconds, the amount of acetaldehyde was equal to 0.0007 $\mu$g/cm$^2$. It was further found that when the heat treating time was extended, further reduction of acetaldehyde was more effectively accomplished. Depending on combination of the heating time with the heating temperature, thus, the amount of acetaldehyde can be reduced to a level equal to or lower than 0.0010 µg/cm².

Although the aforementioned experiments have been performed with respect to the containers of 500 ml, substantially the same results were obtained from the experiments with respect to containers of 1500 ml.

Although the experiments have been carried out with respect to the heat treatment wherein the primary blow-molded articles were in contact with the inner wall of the mold, the heat treatment can be carried out through an external heat such as infrared heater, hot air or microwave.

When the primary blow-molded article is in contact with the inner wall of the mold, almost no time is required to obtain the desired temperature, but when the primary blow-molded article is heated by non-contact heating means, however, it requires time for increasing the temperature.

In such a case, therefore, the heat treating time can be measured after the wall temperature of the primary blow-molded article reaches the desired heat-treating temperature.

Although the machine used in the above experiments separately includes a preform molding device and a blow molding device, the present invention can similarly use one-stage device wherein one molding machine can perform a process from the injection molding step to the final blow molding step. Although the machine includes separate molds for performing the primary blow molding and heat treatment, it may be permitted that the primary blow mold is heated to provide the heat treating mold. In such a case, however, it is difficult to regulate the distribution of wall-thickness in the primary blow molding step.

In order to further reduce time required by the heat treating mold, the primary blow-molded article removed out of the heat treating mold may be further heated by an external heater.

When the final containers molded through the experiments were filled with mineral water or other beverages which were not pasteurized at a high temperature more than 65° C., there is almost no smell peculiar to acetaldehyde.

What is claimed is:

1. A container molding method for molding a non-heat resistant final container for filling with liquids at 65° C. or less, the method comprising:
   a primary blow molding step of stretch-blow-molding a preform made of polyester resin into a primary blow-molded article in a primary mold;
   a step of heating said primary blow-molded article for reducing an amount of acetaldehyde released from said primary blow-molded article in a heated mold having a mold wall, said primary blow-molded article being in contact with the mold wall during heating; and
   a final blow molding step of stretch-blow-molding said primary blow-molded article having a reduced amount of acetaldehyde, relative to a primary blow-molded article which is not heated, into a final container;
   wherein said primary blow molding step molds said primary blow-molded article which is larger in size than said final container and which has an average wall-thickness of a barrel equal to or less than 0.3 mm, and an average wall thickness of the primary blow-molded article is smaller than the average wall-thickness of a barrel of said final container,
   wherein the amount of acetaldehyde released from an inner wall of said final container is reduced relative to a final container prepared by the same method without said step of heating.

2. The container molding method as defined in claim 1, wherein the average wall-thickness of said barrel of said final container is made to be less than 0.3 mm in said final blow molding step.

3. The container molding method as defined in claim 1, wherein said step of heating said primary blow-molded article is at a temperature of 140° C. or higher.

4. The container molding method as defined in claim 3, wherein said step of heating said primary blow-molded article is for a time equal to or shorter than six seconds.

5. The container molding method as defined in claim 4 wherein the step of heating is at a temperature which is less than 220° C.

6. The container molding method as defined in claim 1, wherein said step of heating heats said primary blow-molded article so that the amount of acetaldehyde released from said primary blow-molded article will be equal to or less than 0.004 µg/cm².

7. The container molding method as defined in claim 1, wherein during said step of heating, said primary blow-molded article is put into contact with an inner wall of the heated mold, said mold being substantially the same size as said primary blow-molded article.

8. The container molding method of claim 7, wherein said step of heating is conducted for less than or equal to six seconds.

9. The container molding method as defined in claim 1, wherein in said step of heating, said primary blow-molded article is heated for a time equal to or shorter than six seconds.

10. The container molding method as defined in claim 1, wherein said primary blow molding step is performed in a first mold and said step of heating is performed in a second mold different from said first mold, said second mold being heated.

11. The container molding method as defined in claim 10, wherein said second mold is substantially the same size as said first mold.

12. The container molding method as defined in claim 10, wherein said second mold is the same size as the first mold.

13. The container molding method as defined in claim 12, wherein said second mold is pressurized.

14. The container molding method as defined in claim 12, wherein said second mold is pressurized.

15. A container producing method comprising:
   a primary blow molding step of stretch-blow-molding a preform made of polyester resin into a primary blow-molded article;
   a step of heating said primary blow-molded article for reducing an amount of acetaldehyde released from said primary blow-molded article in a heated mold having a mold wall, said primary blow-molded article being in contact with the mold wall during heating; and
   a final blow molding step of stretch-blow-molding said primary blow-molded article having a reduced amount of acetaldehyde, relative to a primary which is not heated, into a final container,
   wherein said primary blow molding step molds said primary blow-molded article so that a ratio of weight to surface area becomes equal to or less than 0.06 g/cm²,
   whereby the amount of acetaldehyde released from an inner wall of said final container is reduced relative to a final container prepared by the same method without said step of heating.

16. The container molding method as defined in claim 15, further including a step of filling the final container, which is non-heat-resistant with contents at a temperature equal to or lower than 65° C.

17. The container molding method as defined in claim 15, wherein the average wall-thickness of said barrel of said primary blow-molded article is made to be less than 0.3 mm in said primary blow molding step.

18. The container molding method as defined in claim 15, wherein in said step of heating, said primary blow-molded article is heated at a temperature of 140° C. or higher.

19. The container molding method as defined in claim 18, wherein in said step of heating, said primary blow-molded article is heated for a time equal to or shorter than six seconds.

20. The container molding method as defined in claim 15, wherein in said step of heating, said primary blow-molded article is heated for a time equal to or shorter than six seconds.

21. The container molding method as defined in claim 15, wherein said step of heating heats said primary blow-molded article so that the amount of acetaldehyde released from said primary blow-molded article will be equal to or less than 0.004 $\mu g/cm^2$.

22. The container molding method as defined in claim 15, wherein during said step of heating, said primary blow-molded article is put into contact with an inner wall of a mold for heating, said mold being substantially the same size as said primary blow-molded article and having been heated, and the method further includes a step of filling said final container, which is non-heat-resistant, with contents at a temperature equal to or lower than 65° C.

23. The container molding method of claim 22, wherein said step of heating is conducted for less than or equal to six seconds.

24. The container molding method as defined in claim 15, wherein said primary blow molding step is performed in a first mold and said step of heating is performed in a second mold different from said first mold, said second mold being heated.

25. The container molding method as defined in claim 24, wherein said second mold is substantially the same size as said first mold.

26. The container molding method as defined in claim 24, wherein said second mold is the same size as the first mold.

27. A container molding method comprising:

a primary blow molding step of stretch-blow-molding a preform made of polyester resin into a primary blow-molded article in a primary mold;

a step of heating said primary blow-molded article for reducing an amount of acetaldehyde released from said primary blow-molded article; and a final blow molding step of stretch-blow-molding said primary blow-molded article having a reduced amount of acetaldehyde, relative to a primary blow-molded article which is not heated, into a final container;

wherein said primary blow molding step molds said primary blow-molded article which is larger in size than said final container and which has an average wall-thickness of a barrel equal to or less than 0.3 mm, and the primary blow-molded article has an average wall-thickness which is smaller than the average wall-thickness of a barrel of said final container, and wherein the amount of acetaldehyde released from said container is equal to or less than 0.0020 $\mu g/cm^2$ when said container is stored for 24 hours at 22° C. after said final blow molding step and is reduced relative to a final container produced without heating the primary blow-molded article.

28. A container producing method comprising:

a primary blow molding step of stretch-blow-molding a preform made of polyester resin into a primary blow-molded article;

a step of heating said primary blow-molded article for reducing an amount of acetaldehyde released from said primary blow-molded article; and a final blow molding step of stretch-blow-molding said primary blow-molded article having a reduced amount of acetaldehyde, relative to a primary blow-molded article which is not heated, into a final container, wherein said primary blow molding step molds said primary blow-molded article so that a ratio of weight to surface area becomes equal to or less than 0.06 $g/cm^2$, and wherein the amount of acetaldehyde released from said container is equal to or less than 0.0020 $\mu g/cm^2$ when said container is stored for 24 hours at 22° C. after said final blow molding step.

29. A method of producing a non-heat-resistant final container having an average barrel wall thickness for filling with unpasteurized liquids at 65° C. or less, the method comprising:

a primary blow molding step of stretch-blow-molding a preform made of polyester resin into a primary blow-molded article;

a step of heating said primary blow-molded article for reducing an amount of acetaldehyde released from said primary blow-molded article; and a final blow molding step of stretch-blow-molding said primary blow-molded article saving a reduced amount of acetaldehyde, relative to a primary blow-molded article which is not heated, into a final container, wherein said primary blow molding step molds said primary blow-molded article so that a ratio of weight to surface area becomes equal to or less than 0.06 $g/cm^2$, whereby the amount of acetaldehyde released from an inner wall of said final container is reduced relative to a final container prepared by the same method without said step of heating and with said weight to surface area greater than 0.06 $g/cm^2$, and further comprising a step of filling the final container with unpasteurized liquid at 65° C. or less.

* * * * *